May 30, 1939. S. B. SMITH 2,160,093
DIRECTION FINDING AERIAL SYSTEM
Filed July 17, 1936
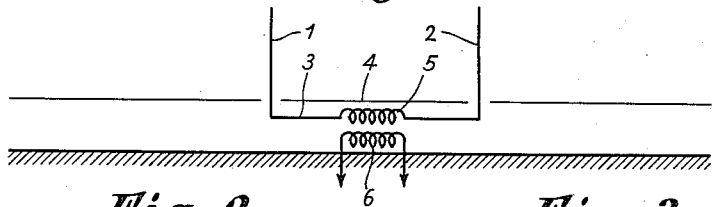
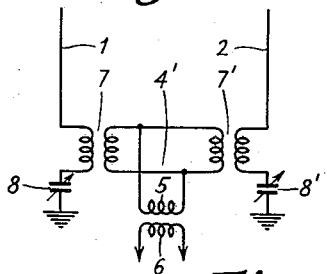
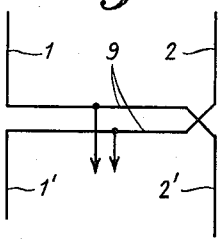
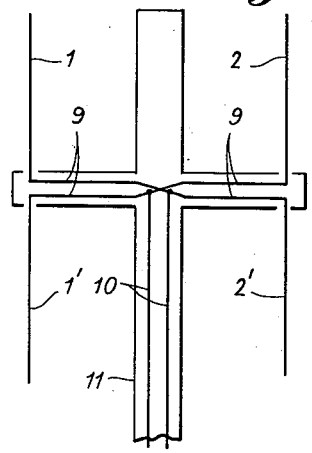
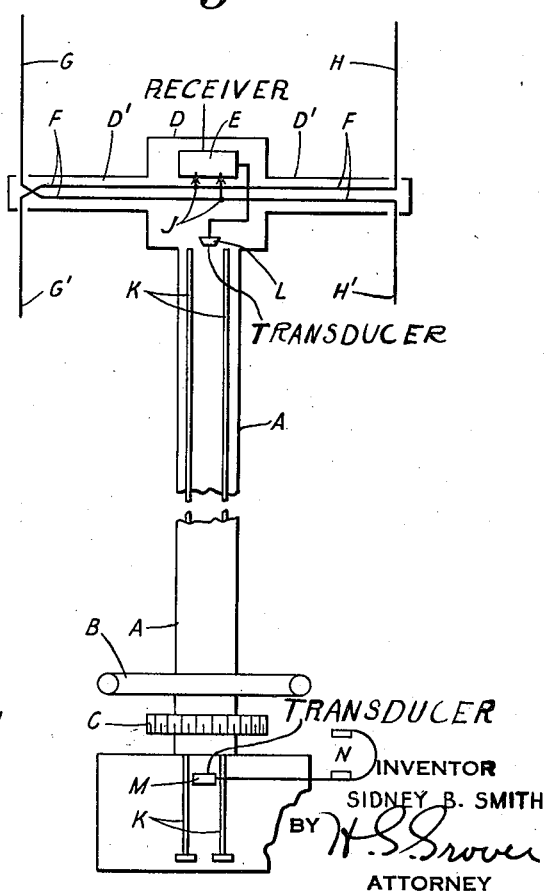
INVENTOR
SIDNEY B. SMITH
BY
ATTORNEY Patented May 30, 1939

2,160,093

UNITED STATES PATENT OFFICE 2,160,093

DIRECTION FINDING AERIAL SYSTEM

Sidney Bertram Smith, Chelmsford, England, assignor to Radio Corporation of America, a corporation of Delaware Application July 17, 1936, Serial No. 91,069
In Great Britain August 31, 1935

4 Claims. (Cl. 250—11)

This invention relates to direction finding aerial systems and more particularly to aerial systems of the so-called Adcock type and similar types, i. e. systems in which a pair of spaced vertical aerials coupled to a centrally disposed receiver by means of horizontal screened or neutralized feeders is utilized for indicating the direction of incident waves.

My invention will be hereinafter fully described, reference being made to the accompanying drawing in which Figs. 1, 2 and 3 show respectively different arrangements of an Adcock aerial system with which my invention is concerned;

Fig. 4 shows a preferred embodiment of the invention wherein vertical dipoles are interconnected by a screened two-wire feeder arrangement; and Fig. 5 shows a modification in which a vertical tubular support or hollow shaft of insulating material is provided on which the dipoles are mounted.

A common form of Adcock aerial as employed on short or medium wave lengths, i. e. on wave lengths greater than 10 meters is shown in conventional manner in the accompanying Fig. 1 and comprises a pair of vertical open aerials 1, 2, connected together through a horizontal feeder 3 screened by an earthed shield 4, an inductance 5 which is coupled to a coil 6 leading to the receiver (not shown) being connected in the middle of said horizontal screened feeder 3. An alternative arrangement utilizing a balanced aerial system is shown in the accompanying Fig. 2 and comprises a pair of spaced vertical open aerials 1, 2, having connected between the foot of each aerial and earth, an inductance 7 or 7′ and a balancing condenser 8 or 8′ said inductances 7, 7′ being coupled each to a two-wire horizontal feeder 4′ which is in turn coupled at a central point to the receiver via coils 5, 6.

These arrangements may be rotatable as a whole about a central vertical axis but more usually, particularly on the longer wave lengths, two pairs of such spaced vertical aerials are arranged in mutually perpendicular vertical planes and coupled at a central point to a radiogoniometer coil.

It is well known that an ideal Adcock aerial which is free from polarization errors, would consist as shown in the accompanying Fig. 3 of a pair of spaced vertical dipoles 1, 1′, 2, 2′, coupled by feeders 9 to a centrally disposed receiver (not shown) and rotatable about a vertical axis, the aerials together with the receiver being located at a considerable distance above the earth's surface so that the aerial balance discriminating against the reception of horizontally polarized waves would be substantially complete. In view of the fact, however, that in practice it is found necessary to employ a spacing between the aerials of the order of 0.1 of a wave length in order to provide sufficient pick-up, it will be seen that the use of an ideal aerial, as above described, becomes impracticable except on ultra-short waves.

One possible arrangement for use on ultra-short waves, i. e. on wave lengths of, say, from 1 to 10 meters, in which range the waves have optical or quasi-optical properties, would consist as shown in the accompanying Fig. 4 of a pair of vertical dipoles 1, 1′; 2, 2′, interconnected by a screened two-wire feeder arrangement 9, the upper half of the one dipole being connected to the lower half of the other and, vice versa, so that the currents in the two horizontal connecting wires substantially neutralize or cancel one another the said horizontal feeder being connected at a central point by a vertical two-wire screened feeder 10 to a receiver (not shown) located at ground level. However, in such an arrangement the screening or shielding means (indicated generally by reference 11) would give rise to substantial polarization errors due to the large mass of metal near the lower halves of the dipoles, and such a design would, therefore, fail to approximate very closely to the ideal Adcock aerial and cannot, therefore, be regarded as satisfactory.

The present invention has for its object to provide an improved arrangement suitable for use on the so-called optical or quasi-optical wave lengths and wherein the disadvantages accompanying the use of any metallic connection between the aerial and ground, may be entirely obviated. Such an arrangement comprises, in accordance with the invention a pair of spaced vertical dipole aerials inter-connected by a two-wire screened or shielded feeder arrangement at the mid-point of which is located a remotely controlled self-contained radio receiver including detecting and translating means for reproducing the received signals in the form of indications which are transmitted to ground level by visual, acoustic, or other radiation means, whereby metallic connection between the receiver and ground may be entirely obviated. The receiver is preferably arranged to be remotely controlled through vertical operating rods of insulating material, and the receiver and dipole aerial system are arranged to be rotatable as a unit about a vertical support of insulating material.

One arrangement in accordance with the invention is shown in the accompanying Fig. 5. Here there is provided a vertical tubular support or hollow shaft A of insulating material mounted so as to be rotatable about its axis by means of a suitable hand wheel B at the foot of the shaft, a graduated scale C being provided to give an indication of the orientation at any instant.

The support, which is a plurality of wave lengths long, carries at the upper end thereof within a metallic shielding box D a radio receiver E the said shielding box being provided with laterally extending tubular portion D' within which are arranged the feeder connections F to a pair of vertical dipoles G G' H H' carried at or near the extremities of said laterally extending portions. The vertical dipoles are arranged at a distance apart of approximately 0.1 of a wave length, the upper half of one dipole being connected within the tubular shielding means to the lower half of the opposite dipole, and vice versa. The input terminals of the receiver are connected at J to the mid-points of the said cross-connections, the receiver being a self-contained unit provided with the necessary batteries and signal detecting and indicating means and controlled by means of insulating rods K extending upwards within the vertical tubular support A. The signal indicating or reproducing means may consist of a loud-speaker L adapted to direct sound waves down the tubular support in which case a microphone M or other sound pick-up device is located at the bottom end of said tubular support, and is connected up to head phones N or other indicating means. With an arrangement of this kind, the attenuation of the sound waves will be substantially constant and independent of the position of the aerial system except for the output amplitude changes due to the directional characteristics of the spaced dipoles.

In an alternative arrangement (not illustrated) optical means may be used for transmitting indications in accordance with received signals to ground level. For example, the output of the receiver can be arranged to energize a neon lamp or to actuate an oscillograph or the like, located at the top of the tubular support, light responsive means being located at the base of the tubular support for picking up the optical signals transmitted therethrough.

It will be seen that by reason of the symmetrical disposition of the receiver with respect to the aerial system and of the entire absence of any conductive connection to earth, the invention provides a practical embodiment of the ideal Adcock aerial suitable for use on ultra-short waves and in which polarization errors are substantially eliminated.

I claim:

1. A direction finding installation of the Adcock type suitable for use on ultra-short wave lengths comprising a pair of spaced vertical dipole aerials, means including a two-wire feeder arrangement for interconnecting the top half of one dipole with the bottom half of the other and vice versa, connections between the mid-points of the wires of said feeder arrangement and the input terminals of an adjacent receiver, a shielding housing for said feeder arrangement and said receiver, said housing and its contents being carried above ground by a rotatable tubular support a plurality of wave lengths long, means adjacent the bottom of said support for rotating the same, means housed within said support for remotely controlling said receiver, a responsive device energized by the output of said receiver and arranged to project the effects of the response as beam energy down said tubular support, said device being adjacent said receiver, and means situated adjacent the bottom of said support for picking up and translating said effects.

2. A direction finding installation according to claim 1 and further characterized in that said responsive device comprises a visual indicator and said translating device comprises a light responsive means.

3. In a direction finding system a pair of vertically disposed dipole antennas parallel to one another and mounted for rotation about a vertical axis of symmetry, supporting means having a horizontal member at the extremities of which said dipoles are mounted and having a vertically disposed hollow supporting member of insulating material for rotating said dipoles about said vertical axis of symmetry, a remotely controlled receiver having detecting means connected to said antennas and located adjacent the center of the horizontal supporting member, radiating means operable from said receiver to indicate the response of said receiver to directional signals and located in said vertical axis of symmetry means for transmitting said indication to the lower end of said vertical supporting member and operating rods of insulating material extended longitudinally of said vertical supporting member for adjusting said receiver.

4. In a direction finding system a pair of vertically disposed dipole antennas parallel to one another and mounted for rotation about a vertical axis of symmetry, supporting means having a horizontal member at the extremities of which said dipoles are mounted and having a vertically disposed hollow supporting member of insulating material for rotating said dipoles about said vertical axis of symmetry, a receiver having detecting means connected to said antennas and located adjacent the center of the horizontal supporting member, radiating means operable from said receiver to indicate the response of said receiver to the directional signals and located in said vertical axis of symmetry electrically insulating means for conducting said indication to the lower end of said vertical supporting member and separate electrically insulating means housed within said vertical supporting member for adjusting said receiver from the lower end of said vertical supporting member.

SIDNEY BERTRAM SMITH.